US009484852B2

(12) United States Patent
Timmons et al.

(10) Patent No.: US 9,484,852 B2
(45) Date of Patent: Nov. 1, 2016

(54) HIGH POWER LOW VOLTAGE ELECTRIFIED POWERTRAIN

(71) Applicants: Adam Timmons, Birmingham, MI (US); Anand Sathyan, Auburn Hills, MI (US); Marian Mirowski, West Bloomfield, MI (US)

(72) Inventors: Adam Timmons, Birmingham, MI (US); Anand Sathyan, Auburn Hills, MI (US); Marian Mirowski, West Bloomfield, MI (US)

(73) Assignee: FCA US LLC, Auburn Hills, MI (US)

( * ) Notice: Subject to any disclaimer, the term of this patent is extended or adjusted under 35 U.S.C. 154(b) by 18 days.

(21) Appl. No.: 14/246,636

(22) Filed: Apr. 7, 2014

(65) Prior Publication Data

US 2015/0288313 A1    Oct. 8, 2015

(51) Int. Cl.
*H02P 1/00* (2006.01)
*H02P 25/22* (2006.01)
(Continued)

(52) U.S. Cl.
CPC ............. *H02P 25/22* (2013.01); *B60L 3/0046* (2013.01); *B60L 3/0061* (2013.01); *B60L 3/0069* (2013.01); *B60L 11/123* (2013.01); *B60L 11/14* (2013.01); *B60L 11/1803* (2013.01); *B60L 11/1864* (2013.01); *B60L 11/1879* (2013.01); *B60L 11/1881* (2013.01); *B60L 15/20* (2013.01); *B60L 15/28* (2013.01); *B60L 2210/40* (2013.01); *B60L 2220/12* (2013.01); *B60L 2220/14* (2013.01); *B60L 2220/58* (2013.01); *B60W 10/08* (2013.01); *Y02T 10/6217* (2013.01); *Y02T 10/641* (2013.01); *Y02T 10/645* (2013.01); *Y02T 10/7005* (2013.01); *Y02T 10/7061* (2013.01); *Y02T 10/7077* (2013.01); *Y02T 10/7241* (2013.01); *Y02T 10/7275* (2013.01); *Y02T 90/34* (2013.01)

(58) Field of Classification Search
CPC ........... Y02T 10/7005; Y02T 10/7077; Y02T 10/70; B60W 10/08; B60W 20/00
USPC ........................................................ 318/139
See application file for complete search history.

(56) References Cited

U.S. PATENT DOCUMENTS

| 4,363,999 A * | 12/1982 | Preikschat ................... 318/53 |
| 6,400,116 B1 * | 6/2002 | Chen et al. .................. 318/599 |
| 8,497,687 B2 * | 7/2013 | Bauer et al. ................. 324/510 |
| 2005/0052080 A1 | 3/2005 | Maslov et al. |

(Continued)

FOREIGN PATENT DOCUMENTS

EP    1413046 A1    4/2004

OTHER PUBLICATIONS

International Search Report and Written Opinion dated Aug. 12, 2015 for International Application No. PCT/US2015/023859, International Filing Date Apr. 1, 2015.

*Primary Examiner* — Kawing Chan
*Assistant Examiner* — Bradley Brown
(74) *Attorney, Agent, or Firm* — Ralph E. Smith

(57) ABSTRACT

An electrified powertrain includes an electric motor having four or more coils corresponding to four or more AC phases and configured to generate drive torque to propel an electrified vehicle. The electrified powertrain also includes a low voltage electrical system comprising independent battery modules each configured to output a separate low DC voltage, and a power inverter module (PIM) configured to receive each of the separate low DC voltages from the battery modules, generate a separate low AC voltage for each AC phase using all of or fewer than all of the separate low DC voltages, and output the separate low AC voltages to the coils of the electric motor to drive the electric motor to generate the drive torque to propel the electrified vehicle, wherein none of the separate low DC voltages are electrically isolated and none of the separate AC voltages are considered high voltage.

15 Claims, 2 Drawing Sheets

(51) Int. Cl.
*B60L 11/18* (2006.01)
*B60L 3/00* (2006.01)
*B60L 11/12* (2006.01)
*B60L 11/14* (2006.01)
*B60L 15/20* (2006.01)
*B60L 15/28* (2006.01)
*B60W 10/08* (2006.01)

(56) References Cited

U.S. PATENT DOCUMENTS

| | | | |
|---|---|---|---|
| 2005/0127856 A1* | 6/2005 | Maslov | B60L 8/00 318/400.21 |
| 2010/0225258 A1* | 9/2010 | Namuduri | B60K 6/485 318/400.3 |
| 2012/0062176 A1* | 3/2012 | Hasan et al. | 320/109 |

* cited by examiner

HIGH POWER LOW VOLTAGE ELECTRIFIED POWERTRAIN

FIELD

The present disclosure relates generally to electrified vehicles and, more particularly, to a high power, low voltage electrified powertrain for electrified vehicles.

BACKGROUND

Electrified vehicles operate an electric motor to generate drive torque for propulsion. The electric motor receives an alternating current that causes the electric motor to rotatably turn to generate the drive torque. An inverter converts a direct current from a battery system to the alternating current for the electric motor. Due to the power output demands of electric motors in electrified vehicles, the battery system typically has a high voltage, e.g., several hundred Volts. High voltage vehicle electrical systems require electrical isolation, which increases costs and/or system complexity. Thus, there remains a need for improvement in the relevant art of high power electrified powertrains for electrified vehicles.

SUMMARY

In one exemplary aspect, a high power, low voltage electrified powertrain for an electrified vehicle is provided in accordance with the teachings of the present disclosure. The electrified powertrain includes an electric motor having four or more coils corresponding to four or more alternating current (AC) phases, the electric motor being configured to generate drive torque to propel the electrified vehicle. The electrified powertrain also includes a low voltage electrical system comprising four or more independent battery modules each configured to output a separate low direct current (DC) voltage, and a power inverter module (PIM) configured to receive the separate low DC voltages from the battery modules, generate (i) a separate low AC voltage for each AC phase using the separate low DC voltages or (ii) a separate low AC voltages for each AC phase using fewer than all of the separate low DC voltages, and output the separate low AC voltages to the coils of the electric motor to drive the electric motor to generate the drive torque to propel the electrified vehicle, wherein none of the separate low DC voltages are electrically isolated.

In some implementations, the four or more independent battery modules are not connected in series. In some implementations, each of the separate low DC voltages is less than a minimum DC voltage that requires electrical isolation. In one exemplary implementation, the minimum DC voltage that requires electrical isolation is approximately 60 Volts DC.

In some implementations, each of the separate low AC voltages is less than an AC voltage that is considered high voltage. In one exemplary implementation, the AC voltage that is considered high voltage is approximately 30 Volts AC.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed implementations and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
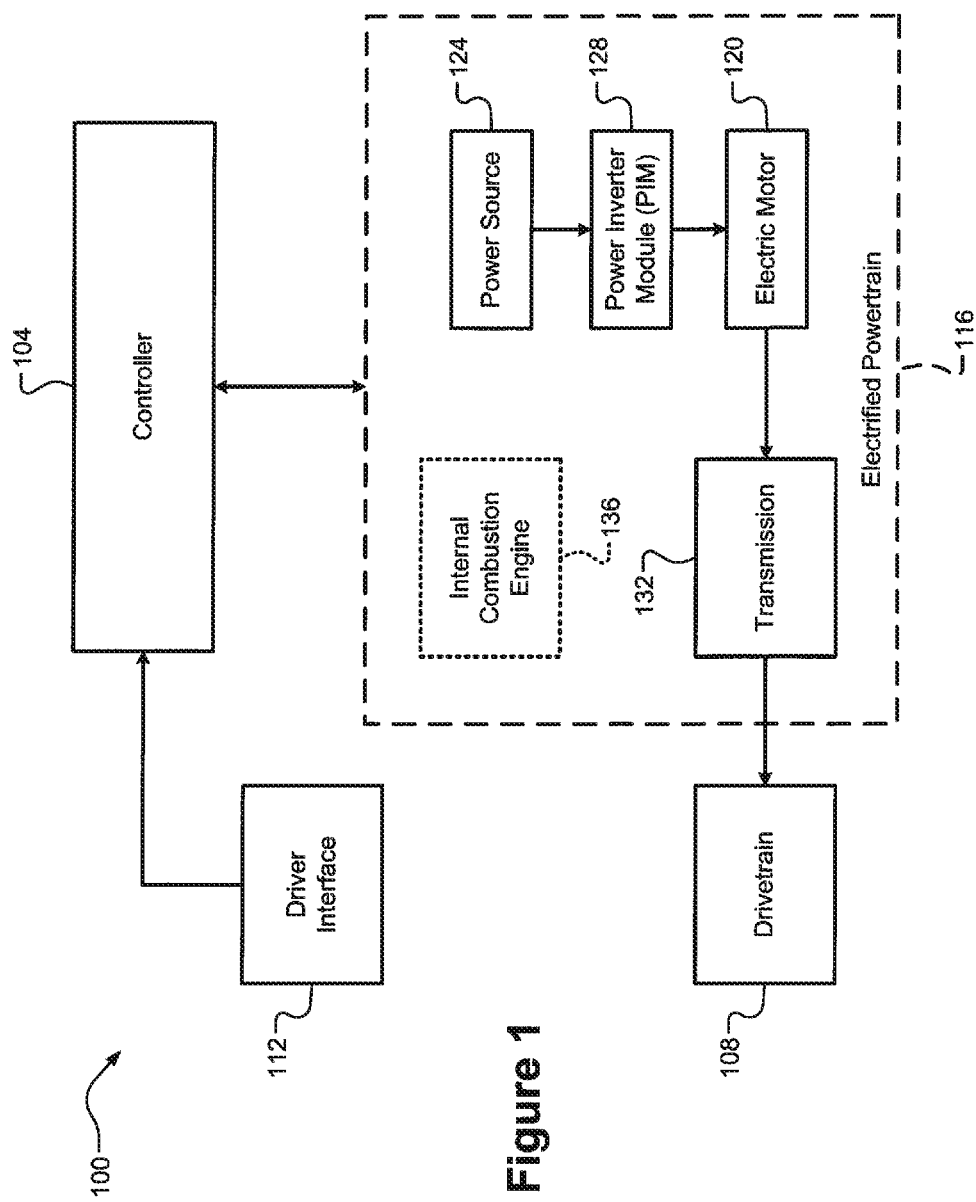
FIG. 1 is an example functional block diagram of an electrified vehicle having an electrified powertrain according to the principles of the present disclosure.

As previously mentioned, there remains a need for improvement in the relevant art of high power electrified powertrains for electrified vehicles because high voltage electrical systems used in such electrified powertrains require electrical isolation. More particularly, any DC voltage greater than a specific voltage threshold requires electrical isolation and any DC or AC voltage greater than specific voltage thresholds require electrical isolation detection and systems to detect if there has been an exposure of high voltage. For example, these voltage thresholds could be defined by government regulations. As one of ordinary skill in the art will readily appreciate, electrical isolation involves implementing additional contactors and control circuitry, as well as sensor circuitry for detecting and verifying the electrical isolation and the exposure of high voltage. This increases costs and/or complexity of the electrical system for an electrified vehicle.

Accordingly, systems are presented for low voltage high power electrified powertrains for electrified vehicles. The electrified powertrain includes low voltage components that do not require electrical isolation or systems to detect the exposure of high voltage, but that could collectively provide high power for powering an electric motor in order to propel an electrified vehicle. In one implementation, the electrified powertrain includes four or more distributed or independent battery modules each configured to generate and output a separate low DC voltage to a controller. These independent battery modules are not connected in series in order to not generate a single high DC voltage for powering the electric motor. As a result, each of the separate low DC voltages is less than a DC isolation threshold, e.g., ~60 Volts DC, and therefore does not require electrical isolation.

Each of the independent battery modules could also be independently regulated and adjusted for optimal interoperability. The controller converts the separate low DC voltages to separate low AC voltages and outputs the separate low AC voltages to four or more coils of the electric motor. In one embodiment, the controller is a power inverter module (PIM). While specific implementations of six and nine independent battery modules and electric motor coils are discussed herein, it should be appreciated that the present disclosure are also applicable to any number of independent battery modules and electric motor coils greater than three (four, five, seven, eight, ten, etc.). The controller could output less than all of the separate low AC voltages to the coils of the electric motor when less drive torque is required, thereby increasing the efficiency of the electrified powertrain and, in some cases, increase torque output.

Similarly, the controller could also output all of the separate low AC voltages to the coils of the electric motor for maximum drive torque, which could be greater than a typical electrical motor having a single AC voltage. Each of the separate low AC voltages is less than an AC voltage that is considered a high voltage and thus would require the detection of isolation and the detection of exposure of high voltage, e.g., ~30 Volts AC, and therefore does not require electrical isolation or the detection of exposure of high voltage. By not requiring electrical isolation, electrical isolation detection, or the detection of the exposure of high voltage, the electrified powertrain requires less components/complexity while still providing the high power required to propel the electrified vehicle. More specifically, the electrified powertrain would not require additional contactors and sensor circuitry for detecting and verifying the electrical isolation. Similarly, a controller for the electrified powertrain would not require additional software to perform the detection and verification routines.

In addition, design measures employed to achieve isolation in high voltage electrical systems such as negative DC voltage system terminals are isolated from a housing of an electrical device in a high voltage system but are attached to the housing in a low voltage system. Also, high voltage architectures require a high voltage interlock safety system that is able to detect whether points of access to high voltage are exposed, which requires controller high voltage interlock loop (HVIL) sourcing and detection and associated software, whereas no such provision is necessary for a low voltage system. Further, the low voltage electrified powertrain is also capable of easy customization and serviceability by an end user who is not trained in high voltage safety. For example, this customization could include adding upgrades to the electrified powertrain, such as performance upgrades. In contrast, a high voltage electrical powertrain requiring electrical isolation is not easily customized, e.g., by an owner of the electrified vehicle.

Referring now to FIG. 1, a functional block diagram of an electrified vehicle 100 is illustrated. Examples of the electrified vehicle 100 include a battery electric vehicle (BEV), an extended-range electric vehicle (EREV), a fuel cell electric vehicle (FCEV), and a hybrid electric vehicle (HEV) such as a plug-in HEV (PHEV) and a non-plug-in HEV. The electrified vehicle 100 could also be another suitable electrified vehicle. The EV 100 includes a controller 104 that controls operation of the electrified vehicle 100. In some implementations, the controller 104 is referred to as an electrified vehicle control unit (EVCU).

Specifically, the controller 104 controls drive torque supplied to a drivetrain 108 (one or more wheels, a differential, etc.) in response to a torque request via a driver interface 112. The driver interface 112 is one or more devices configured to allow a driver of the electrified vehicle 100 to input a torque request, e.g., an accelerator pedal. The drive torque is supplied to the drivetrain 108 from an electrified powertrain 116. The electrified powertrain 116 is a high power electrified powertrain capable of generating enough drive torque to propel the electrified vehicle 100. In one exemplary implementation, the electrified powertrain 116 for a BEV includes an electric motor 120, a power source 124, a power inverter module 128 (PIM) or another other suitable DC-to-AC inverter, and a transmission 132. The transmission 132 transfers drive torque generated by the electric motor 120 to the drivetrain 108.

The power source 124 outputs separate low DC voltages, which are converted to separate low AC voltages by the PIM 128. The separate low AC voltages are output by the PIM 128 and used to rotatably drive the electric motor 120 to generate drive torque. Examples of the electric motor 120 are synchronous electric motors and induction (asynchronous) electric motors. In some implementations (EREV, HEV, etc.), the electrified powertrain 116 could optionally include an internal combustion engine 136. The internal combustion engine 136 combusts a mixture of air and fuel, e.g., gasoline, within cylinders to rotatably drive a crankshaft and generate drive torque. In one implementation, the internal combustion engine 136 is coupled to an electrically variable transmission (EVT) 132 utilizing two electric motors 120 and is utilized to both provide motive power and recharge the power source 124, e.g., during driving of the electrified vehicle 100. In this regard, it will be appreciated that the electrified powertrain 116 could be implemented in various forms so as to not require electrical isolation or other design requirements necessary for a high voltage system such as HVIL, as will be discussed in more detail below.

Figure 2:
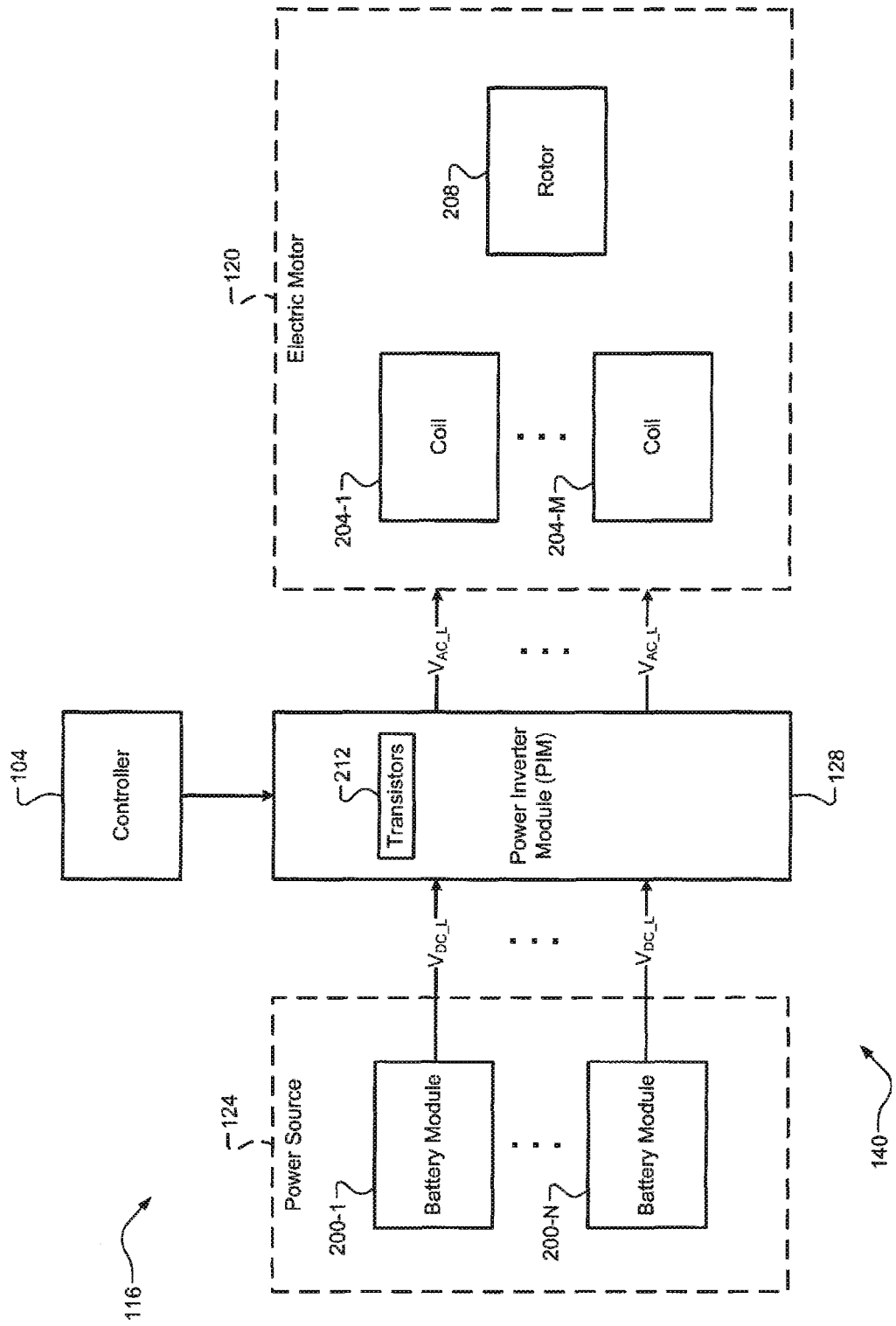
FIG. 2 is an example diagram of the electrified powertrain according to the principles of the present disclosure.

Referring now to FIG. 2, an example diagram of the electrified powertrain 116 is illustrated. The PIM 128 is either a standalone module or part of the controller 104. The PIM 128 (or the controller 104, if part of the controller 104) includes one or more processors configured to perform the operations of the present disclosure including, but not limited to, controlling DC-to-AC voltage conversion discussed in further detail below. The power source 124 and the PIM 128 (and the controller 104, if applicable) are collectively referred to as a low voltage electrical system 140. The low voltage electrical system 140 has low voltages that do not require electrical isolation or other design requirements necessary for a high voltage system such as HVIL.

The power source 124 includes N battery modules 200-1 . . . 200-N (N>3, collectively "battery modules 200") each configured to generate and output a separate low DC voltage ($V_{DC\_L}$). In one exemplary implementation, the battery modules 200 are not connected in series and thus are also referred to as distributed or independent battery modules 200. The collective magnitude of the separate low DC voltage $V_{DC\_L}$ power generated and output by the battery modules 200 is large enough (after DC-AC conversion) to power the electric motor 120 to propel the electrified vehicle 100. In one embodiment, the collective magnitude of the separate low DC voltage $V_{DC\_L}$ powers generated is tens of kilowatts (kW). As previously mentioned, however, any voltage greater than a respective threshold requires electrical isolation. Each of the separate low DC voltages $V_{DC\_L}$, therefore, is less than a DC isolation threshold. In one embodiment, the DC isolation threshold is specified by government regulations. For example only, the DC isolation threshold is 60 Volts DC or approximately 60 Volts DC.

For example only, an exemplary BEV could need the power source 124 to have a voltage rating of approximately 400 Volts DC in order to sufficiently power the approximately 100 kW electric motor 120 with at most 250 Amperes (A) of current. This 400 volt DC line would require electrical isolation. In contrast, according to the present disclosure, seven or more battery modules 200 could be implemented. For example only, seven battery modules 200 each having a voltage rating of approximately 57 Volts DC could be implemented, which collectively correspond to approximately 400 Volts DC. Alternatively, for example only, eight battery modules 200 could be implemented, each of the eight or more battery modules 200 having a voltage rating of approximately 50 Volts DC, which collectively correspond to 400 Volts DC. The same or similar procedure of selecting an appropriate number of battery modules 200 and electrical motor coils could be applied to be sure that the constraint of no electrical isolation detection or detection of exposure of high voltage on the AC voltage lines (after the PIM 128) is satisfied.

The PIM 128 receives the N separate low DC voltages $V_{DC\_L}$ and generates M separate AC voltages (M>3) using the N separate low DC voltages $V_{DC\_L}$. In one embodiment, N equals M. It should be appreciated, however, that M could be a different integer than N. More particularly, the PIM 128 operates as an inverter to convert the N separate low DC voltages $V_{DC\_L}$ to the M separate low AC voltages ($V_{AC\_L}$). In one exemplary implementation, the PIM 128 includes a plurality of transistors 212, and the PIM 128 is configured to control the plurality of transistors 212 to (i) generate the M low AC voltages $V_{AC\_L}$ for the M AC phases using the N separate low DC voltages $V_{DC\_L}$ or (ii) generate the M low AC voltages $V_{AC\_L}$ for the AC phases using fewer than all of the N separate low DC voltages $V_{DC\_L}$. For example, the PIM is configured to control the plurality of transistors 212 to achieve a higher efficiency of the electric motor 120. The collective magnitude of the separate low AC voltages $V_{AC\_L}$ generated and output PIM 128 is large enough to power the electric motor 120 to propel the electrified vehicle 100. Again, any voltage greater than a respective threshold requires electrical isolation detection and other measures detect if there has been an exposure to high voltage. Each of the separate low AC voltages $V_{AC\_L}$, therefore, is less than an AC high voltage threshold. In one embodiment, the AC high voltage threshold is specified by government regulations. For example only, the AC isolation threshold is 30 Volts AC or approximately 30 Volts AC.

The PIM 128 outputs the M separate low AC voltages $V_{AC\_L}$ to M coils 204-1 . . . 204-M (collectively "coils 204"), e.g., stators, of the electric motor 120. In some implementations, the PIM 128 selectively provides the separate low AC voltages $V_{AC\_L}$ to the coils 204, respectively. For example, the PIM 128 could supply less than all of the separate low AC voltages $V_{AC\_L}$ to the coils 204 when less drive torque is requested. In one embodiment, M equals six. In another embodiment, M equals nine. It should be appreciated, however, that the electric motor 120 could include any number of coils 204 greater than three. The M separate AC voltages cause currents to flow through the respective coils 204, which generates magnetic fields. These magnetic fields cause a rotor 208 of the electric motor 120 to rotatably turn, thereby generating the drive torque. The drive torque is then transferred to the drivetrain 112, e.g., via the transmission 132, to propel the electrified vehicle 100.

It will be appreciated that in some exemplary embodiments, a high voltage battery could be mated with a low voltage set of phases or low voltage battery modules could be mated with a high voltage set of motor phases. It will be appreciated by those skilled in the art that the same battery stored energy configured in separate low voltage modules rather than a single high voltage source and the associated discrete provision of voltage to the electric motor phases from each separate module independently provides an opportunity for enhanced reliability while adding a minimal number of additional componentry. For instance, the example embodiment of low voltage elements involves one PIM, one electric motor and one battery composed of several modules or several distributed battery modules, which is equivalently descriptive of a high voltage system.

For instance, in a high voltage battery containing modules containing cells that are configured in series, if a single cell fails to pass current then the entire battery is not able to pass current whereas if the modules containing cells are in parallel then if a cell in a module fails to pass current only that module will fail to pass current. In that instance, the other modules will still provide voltage and current to the other phases of the motor and the electric drive will continue to function. For instance, in a PIM if the switches, for instance a transistor that could be of the type designated insulated gate bipolar transistor (IGBT), between the positive polarity provided by the battery and the motor phase and the negative polarity provided by the battery and the motor phase are simultaneously activated then the result is a short circuit of the battery providing the positive and negative polarities of the DC source voltage and current. The short circuit in one embodiment causes a series fuse to activate thus rendering the battery subsequently unable to provide additional current. In the low voltage embodiment of battery modules furnishing separate phases, the simultaneous activation of both IGBTs on any one phase would render the battery module on that phase in short circuit but would not affect the other phases.

It will also be appreciated by those knowledgeable in the art that the low voltage system provides opportunities for common component carryover and extensibility between electrified vehicle platforms. For instance, in the case of the high voltage system a single high voltage battery could furnish the voltage and current necessary to power more than one electric motor through one PIM and the in the same way a low voltage system battery module could provide voltage and current to power more than one electric motor phase or one or more phases in more than one electric motor. Additionally, in the low voltage system a single motor with a number P phases could be used on multiple vehicle platforms whereby in one example platform all P phases are utilized and supported by P battery modules, and in another embodiment for the same example platform fewer than P battery modules provide fewer than P phases and in another example embodiment of the same example platform fewer than P battery modules provides P phases. The same combination opportunities are also available for other example platforms. If fewer than P phases are utilized then the PIM could be depopulated of, for instance, IGBTs, as possible. The number of battery modules in one example circumstance corresponds to the vehicle packaging opportunities.

It will be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A high power, low voltage electrified powertrain for an electrified vehicle, the electrified powertrain comprising:
a single electric motor having four or more coils corresponding to four or more alternating current (AC) phases, wherein the single electric motor is the only electric motor of the electrified powertrain that is configured to generate drive torque that is sufficient to propel the electrified vehicle; and
a low voltage electrical system comprising:
four or more independent battery modules each configured to output a separate low direct current (DC) voltage; and
a single power inverter module (PIM) configured to:
receive each of the separate low DC voltages from the battery modules;
generate (i) a separate low AC voltage for each AC phase using the separate low DC voltages or (ii) a separate low AC voltage for each AC phase using fewer than all of the separate low DC voltages; and output the separate low AC voltages to the coils of the electric motor to drive the electric motor to generate the drive torque that is sufficient to propel the electrified vehicle, wherein none of the separate low DC voltages are electrically isolated, wherein a sum of the separate low DC voltages is greater than 100 volts DC.

2. The electrified powertrain of claim 1, wherein the four or more independent battery modules are not connected in series.

3. The electrified powertrain of claim 1, wherein the PIM includes a plurality of transistors, and wherein the PIM is configured to control the plurality of transistors to (i) generate the low AC voltages for the AC phases using the separate low DC voltages or (ii) generate the low AC voltages for the AC phases using fewer than all of the separate low DC voltages.

4. The electrified powertrain of claim 3, wherein the PIM is configured to control the plurality of transistors to achieve a higher efficiency of the electric motor.

5. The electrified powertrain of claim 1, wherein each of the separate low DC voltages is less than a minimum DC voltage that requires electrical isolation.

6. The electrified powertrain of claim 5, wherein the minimum DC voltage that requires electrical isolation is approximately 60 Volts DC.

7. The electrified powertrain of claim 1, wherein each of the separate low AC voltages is less than an AC voltage that is considered high voltage.

8. The electrified powertrain of claim 7, wherein the AC voltage that is considered high voltage is approximately 30 volts AC.

9. The electrified powertrain of claim 1, wherein the electric motor has six coils and six corresponding AC phases.

10. The electrified powertrain of claim 1, wherein the electric motor has nine coils and nine corresponding AC phases.

11. The electrified powertrain of claim 1, wherein the electrified vehicle is a battery electric vehicle (BEV).

12. The electrified powertrain of claim 1, wherein the electrified vehicle is an extended-range electric vehicle (EREV), a fuel cell electric vehicle (FCEV), a hybrid electric vehicle (HEV), or a plug-in HEV (PHEV).

13. The electrified powertrain of claim 1, wherein the PIM is configured to generate the separate low AC voltage for each AC phase using fewer than all of the separate low DC voltages.

14. A high power, low voltage electrified powertrain, for an electrified vehicle, the electrified powertrain comprising:

a single electric motor having four or more coils corresponding to four or more alternating current (AC) phases, wherein the single electric motor is the only electric motor of the electrified powertrain that is configured to generate drive torque that is sufficient to propel the electrified vehicle; and a low voltage electrical system comprising:

four or more independent battery modules each configured to output a separate low direct current (DC) voltage; and a single power inverter module (PIM) configured to:

receive each of the separate low DC voltages from the battery modules;

generate (i) a separate low AC voltage for each AC phase using the separate low DC voltages or (ii) a separate low AC voltage for each AC phase using fewer than all of the separate low DC voltages; and output the separate low AC voltages to the coils of the electric motor to drive the electric motor to generate the drive torque that is sufficient to propel the electrified vehicle, wherein none of the separate low DC voltages are electrically isolated, wherein the single electric motor is approximately a 100 kilowatt electric motor capable of receiving up to 250 amperes of current.

15. A high power, low voltage electrified powertrain, for an electrified vehicle, the electrified powertrain comprising:

a single electric motor having four or more coils corresponding to four or more alternating current (AC) phases, wherein the single electric motor is the only electric motor of the electrified powertrain that is configured to generate drive torque that is sufficient to propel the electrified vehicle; and a low voltage electrical system comprising:

four or more independent battery modules each configured to output a separate low direct current (DC) voltage; and a single power inverter module (PIM) configured to:

receive each of the separate low DC voltages from the battery modules;

generate (i) a separate low AC voltage for each AC phase using the separate low DC voltages or (ii) a separate low AC voltage for each AC phase using fewer than all of the separate low DC voltages; and output the separate low AC voltages to the coils of the electric motor to drive the electric motor to generate the drive torque that is sufficient to propel the electrified vehicle, wherein none of the separate low DC voltages are electrically isolated, wherein the sum of the separate low DC voltages is approximately 400 volts DC.

* * * * *